(12) United States Patent
Jamjoom et al.

(10) Patent No.: US 7,761,398 B2
(45) Date of Patent: Jul. 20, 2010

(54) APPARATUS AND METHOD FOR IDENTIFYING PROCESS ELEMENTS USING REQUEST-RESPONSE PAIRS, A PROCESS GRAPH AND NOISE REDUCTION IN THE GRAPH

(75) Inventors: Hani T. Jamjoom, White Plains, NY (US); Raymond B. Jennings, III, Ossining, NY (US); Parviz Kermani, South Salem, NY (US); Debanjan Saha, Mohegau Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 618 days.

(21) Appl. No.: 11/625,596

(22) Filed: Jan. 22, 2007

(65) Prior Publication Data

US 2008/0177586 A1    Jul. 24, 2008

(51) Int. Cl.
G06F 9/44 (2006.01)
G06N 7/00 (2006.01)
(52) U.S. Cl. .............................. 706/52; 706/47; 706/46
(58) Field of Classification Search ....................... None
See application file for complete search history.

(56) References Cited

U.S. PATENT DOCUMENTS 5,734,837 A    3/1998  Flores et al.
6,058,413 A    5/2000  Flores et al.
6,308,161 B1  10/2001  Boden et al.
6,571,246 B1   5/2003  Anderson et al.

OTHER PUBLICATIONS

Olshefski et al., D., "Understanding the Management of Client Perceived Response Time", 2006.*
Apostolopoulos et al., G., "Design, Implementation and Performance of a Content-Based Switch", 2000.*
Bharath-Kumar et al., K., "Performance Evaluation Tool(PET): An Analysis Tool for Computer Communication Networks", 1984.*
Weiss et al., "Business Process Modeling with URN", 2005.*
Biegus et al., "InDia: a framework for workflow interoperability support by means of multi-agent systems", 2004.*

* cited by examiner

*Primary Examiner*—Donald Sparks
*Assistant Examiner*—Adrian L Kennedy
(74) *Attorney, Agent, or Firm*—Ryan, Mason & Lewis, LLP

(57) ABSTRACT

An exemplary method for identifying process elements includes the steps of obtaining a plurality of relevant request-response pairs including request identifiers, mapping the request identifiers to corresponding artifacts, identifying actions based on the artifacts, and mapping the actions to process elements such that each given one of the process elements has an associated artifact.

12 Claims, 4 Drawing Sheets

APPARATUS AND METHOD FOR IDENTIFYING PROCESS ELEMENTS USING REQUEST-RESPONSE PAIRS, A PROCESS GRAPH AND NOISE REDUCTION IN THE GRAPH

FIELD OF THE INVENTION

The present invention relates generally to information technology, and more particularly relates to analysis of processes using such technology.

BACKGROUND OF THE INVENTION

Information Technology (IT) systems evolve with time; they are often maintained and upgraded by a separate department (or departments) from those deciding future enterprise directions and usages of the underlying system. This presents a challenge for enterprises and organizations wanting to construct an accurate model of processes, such as enterprise processes, corresponding to the currently-running IT systems (when such models do not exist), or wanting to track the changes or check the compliance of the IT systems (when the underlying processes do exist).

There are currently some techniques that engage in data mining from a system log, however, it is believed that these techniques do not focus on correlating user activity (via network and system monitoring) to the corresponding process. They also do not focus on automatic identification of the role players who act on a task or a collection of tasks in the process.

It would thus be desirable to overcome the limitations in previous approaches.

SUMMARY OF THE INVENTION

Principles of the present invention provide techniques for analyzing processes. In one aspect, an exemplary method for identifying process elements includes the steps of obtaining a plurality of relevant request-response pairs including request identifiers, mapping the request identifiers to corresponding artifacts, identifying actions based on the artifacts, and mapping the actions to process elements such that each given one of the process elements has an associated artifact.

One or more embodiments of the invention can be implemented in the form of a computer product including a computer usable medium with computer usable program code for performing the method steps indicated. Furthermore, one or more embodiments of the invention can be implemented in the form of an apparatus including a memory and at least one processor that is coupled to the memory and operative to perform exemplary method steps.

These and other features and advantages of the present invention will become apparent from the following detailed description of illustrative embodiments thereof, which is to be read in correction with the accompanying drawings.

DETAILED DESCRIPTION OF PREFERRED EMBODIMENTS

The present invention will be described herein in the context of exemplary methods and apparatus for inserting processes, such as (but not limited to) enterprise processes, and the associated role players using network and systems monitoring. It is to be understood, however, that the techniques of the present invention are not limited to the methods and apparatus shown and described herein.

In one example, an enterprise system, which includes multiple (and possibly heterogeneous) applications, is monitored, both at the network level and the system level. When users drive their enterprise activities via interaction with the aforementioned enterprise system, the corresponding enterprise processes are constructed, which capture key enterprise activities as well as the categories of users or role players of the system.

Figure 1:
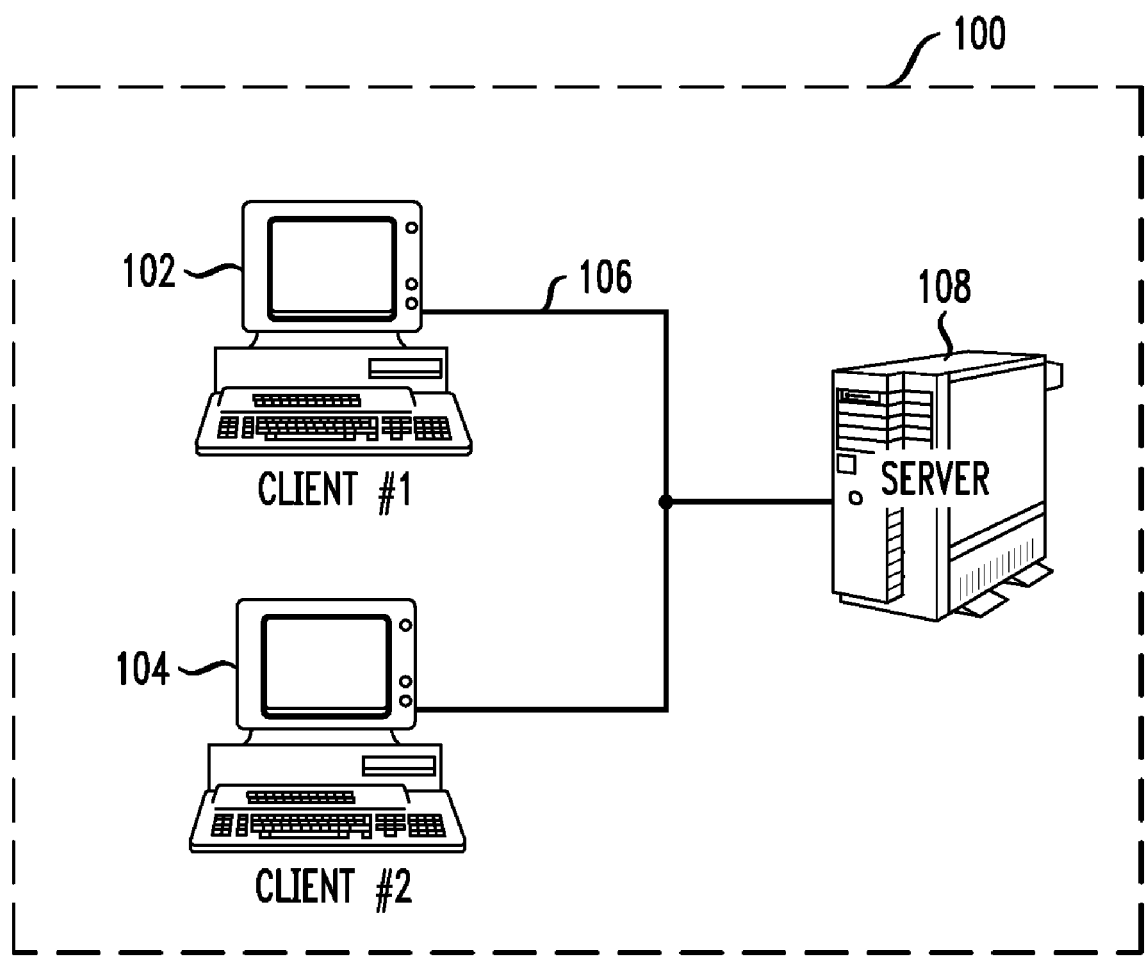
FIG. 1 is a simplified block diagram showing an exemplary networked system with which an embodiment of our invention may be used.

FIG. 1 is a simplified block diagram showing an exemplary networked system with which an embodiment of our invention may be used. A system 100 comprises at least one server 108 which is connected via a network 106 to client devices 102 and 104. Client devices 102 and 104 may include any device that a user can use to execute enterprise activities with the server 108. The network connection 106 may comprise the Internet, local area network, a cable or satellite network or any other system wherein communications between a client application and a server are possible.

Figure 2:
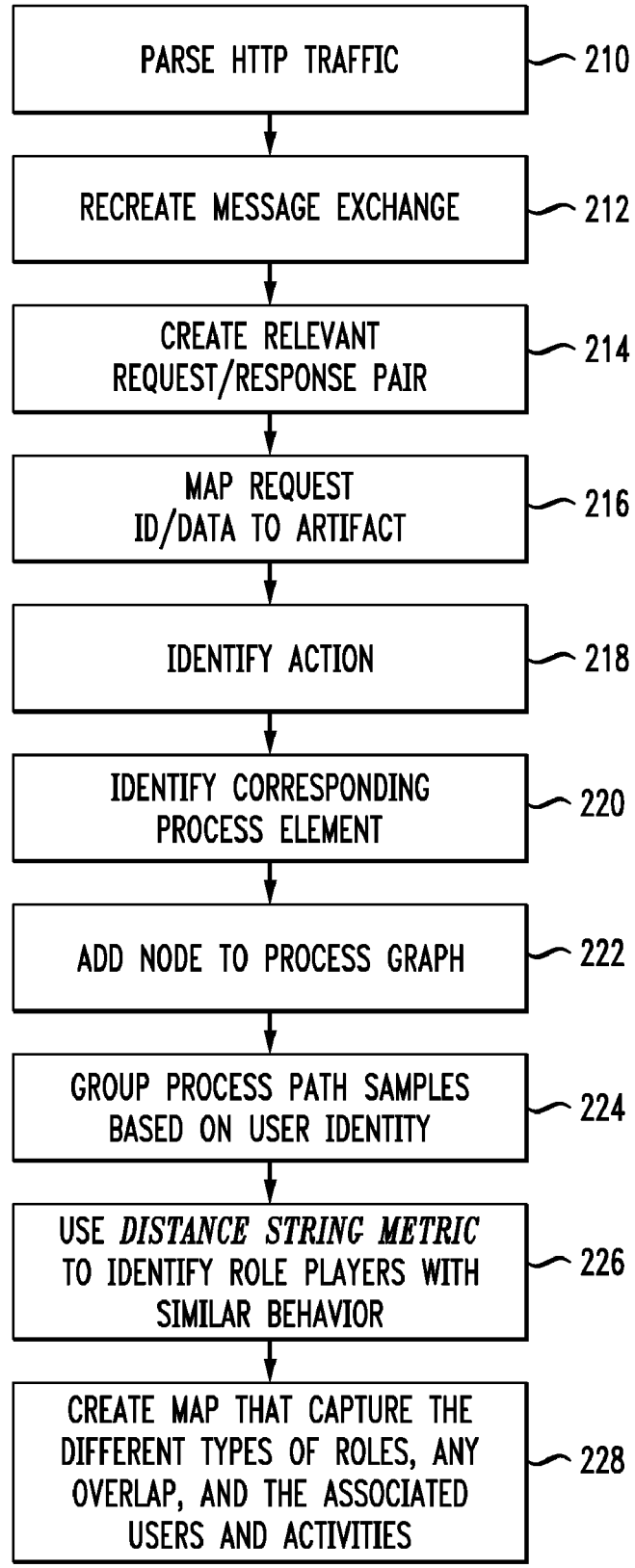
FIG. 2 is a flow diagram showing a flow chart of exemplary method steps according to an aspect of the invention.

FIG. 2 is a flow chart showing exemplary method steps. A first step can include obtaining a plurality of relevant request-response pairs, the request-response pairs including at least request identifiers. One way to obtain such pairs is by carrying out steps 210-214. In step 210, information passing between clients (e.g. 102 and 104 in FIG. 1) and servers (e.g. 108 in FIG. 1) is captured. This information may be taken from, for example, Hyper-Text Transfer Protocol (HTTP) packets. Rule base filtering may then be applied to extract user identities, requests for objects, and return responses.

In step 212, user interactions with the system are recreated from a series of request/response pairs which may span one or more network connections.

Figure 3:
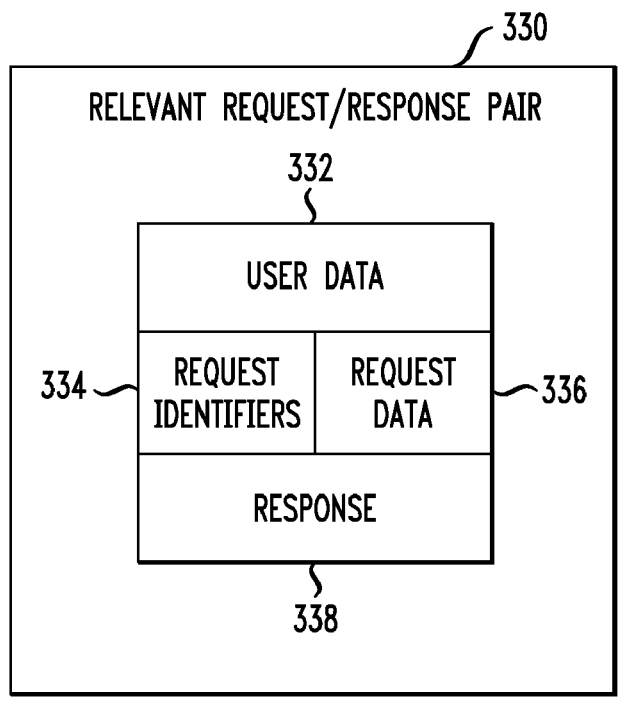
FIG. 3 is a block diagram showing an exemplary relevant request response pair (RRR)

In step 214, request/response pairs are filtered to remove irrelevant information such that only those that correspond to users entering information into the system or requesting new information are kept. These pairs are referred to as the Relevant Request/Response (RRR) pairs; they represent an IT task node. An illustrative RRR structure is shown in FIG. 3 and discussed hereinafter.

In step 216, each Request Identifier (334 in FIG. 3) is mapped to a corresponding artifact. Although Request Identifier's (134) can be described by different words or languages (e.g., "User Name" or "Login Name" can mean the same thing), an enterprise artifact provides a unique representation of similar combinations of request identifiers.

In step 218, actions are identified based on the artifacts, and in step 220, these actions are mapped to corresponding process elements. There is a syntactical difference between an enterprise process element (also referred to as an enterprise operation or enterprise action) and an IT task. Typically, an enterprise process element encompasses multiple IT tasks, having one or more valid causal orders (with each order reflecting a different way of performing the same enterprise process) Identifying the RRR pairs is generally not per se sufficient to identify the corresponding enterprise process elements. Using historic, or pre-populated, IT task models, syntactic interpretation of the RRR pair is then performed When no historic information is available, the request-response pair is modeled as a unique (and unmapped) process element, which can then be manually mapped. Each task is also tagged with the corresponding user information. It is to be understood that the mapping between IT tasks to enterprise process elements can be many-to-many. Thus, whenever multiple IT tasks map to a single enterprise process element, they are grouped together to form a task group.

In step 222, the identified process element and the associated artifact (also referred to as process nodes or nodes) are added to the process flow graph, which also contains transitions between the nodes. Intra-system transitions, which correspond to a user issuing a request/response pair within a single system, ate typically captured in this step by a single monitoring point.

Figure 4:
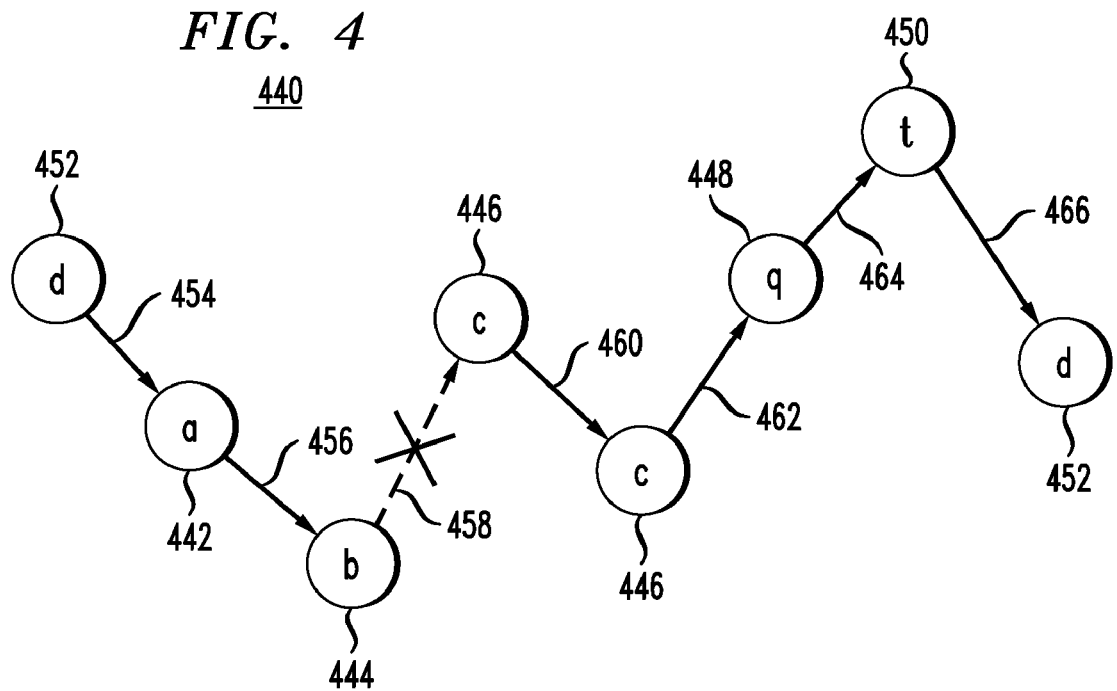
FIG. 4 is a process flow diagram, which provides an example of typical noise that is removed by an illustrative embodiment of the present invention.

Although process discovery algorithms are typically sensitive to noise, each node in the flow graph carries useful context (captured in the RRR pair) that can be used to reduce noise in each sample path Thus, noise reduction may be performed at this stage, as illustrated in FIG. 4 and discussed in conjunction thereto herein.

In step 224, inter-system transitions, in which users are directed to different systems depending on the target activity, are captured via user information (which bridges the information gap that may exist between multiple monitoring points). Because this is a learning mechanism that relies on user activity to build its knowledge, transitions from one process element to another may have different degrees of certainty. This certainty is captured using different mechanisms (for example, Bayesian learning mechanisms) to assign strength to each transition that reflects the level of certainty in the corresponding process graph. Because spurious transitions will also exist in the system, a threshold value can be assigned to increase the accuracy of the generated model.

In step 226, a "distance string metric" algorithm is used to identify the unique processes and group role players with similar behavior because users or role players typically perform a collection of enterprise tasks many times, typically on different enterprise items, as part of one or more enterprise processes.

In step 228, a process map is created that combines overlapping process flows to identify the different process paths through the system. The map also captures the different role players that are associated with each process element.

FIG. 3 is a block diagram showing an exemplary request response pair (RRR) useful with one or more embodiments of the invention. A relevant request/response (RRR) 330 includes four pieces of information: User data 332, Request Identifiers 334, Request Data 336, and Response Information 338

FIG. 4 is a flow diagram, which provides an example of typical noise that is removed by an illustrative embodiment of the present invention In this figure, a process is represented by a node with its unique identifier by the letter in that node. This exemplary process flow 440 contains eight nodes: 442, 444, 446, 448, 450, 452, two of which are duplicates: 446 and 452. There are also measured transitions between these nodes: 454, 456, 458, 460, 462, 464, and 466.

Several basic policies can be applied to reduce noise in the process graph, three of which are illustrated herein In a first policy, duplicate nodes in the process flow graph are removed if the difference between two successive nodes is small. For example, this difference may be measured over the four dimensions of user, artifact, data, and action The transition 460 is an example of one that can be removed based on the aforementioned policy.

In a second policy, transitions are removed if an end node is followed by a start node, and the resulting two sample paths are split into two separate processes Removing the transition 458 and splitting the process into two parts is an example of such a policy.

In a third policy, artifact information (which includes Request Data) is used to separate or connect overlapping processes Both instances of 452, for example, can be merged to create a loop in the process, if (and typically only if), all artifact information is identical.

In view of the above discussion, it will be appreciated that one or more embodiments of the invention may provide useful techniques for correlating information from network traffic and systems information, which is monitored at one or multiple points in an enterprise system Specifically, by combining two types of input, namely, pre-populated IT processes and captured network and systems data, multi-level enterprise processes can be automatically constructed with the corresponding actors (or role players) identified in each process task.

A variety of techniques, utilizing dedicated hardware, general purpose processors, firmware, software, or a combination of the foregoing may be employed to implement the present invention One or more embodiments of the invention can be implemented in the form of a computer product including a computer usable medium with computer usable program code for performing the method steps indicated. Furthermore, one or more embodiments of the invention can be implemented in the form of an apparatus including a memory and at least one processor that is coupled to the memory and operative to perform exemplary method steps.

Figure 5:
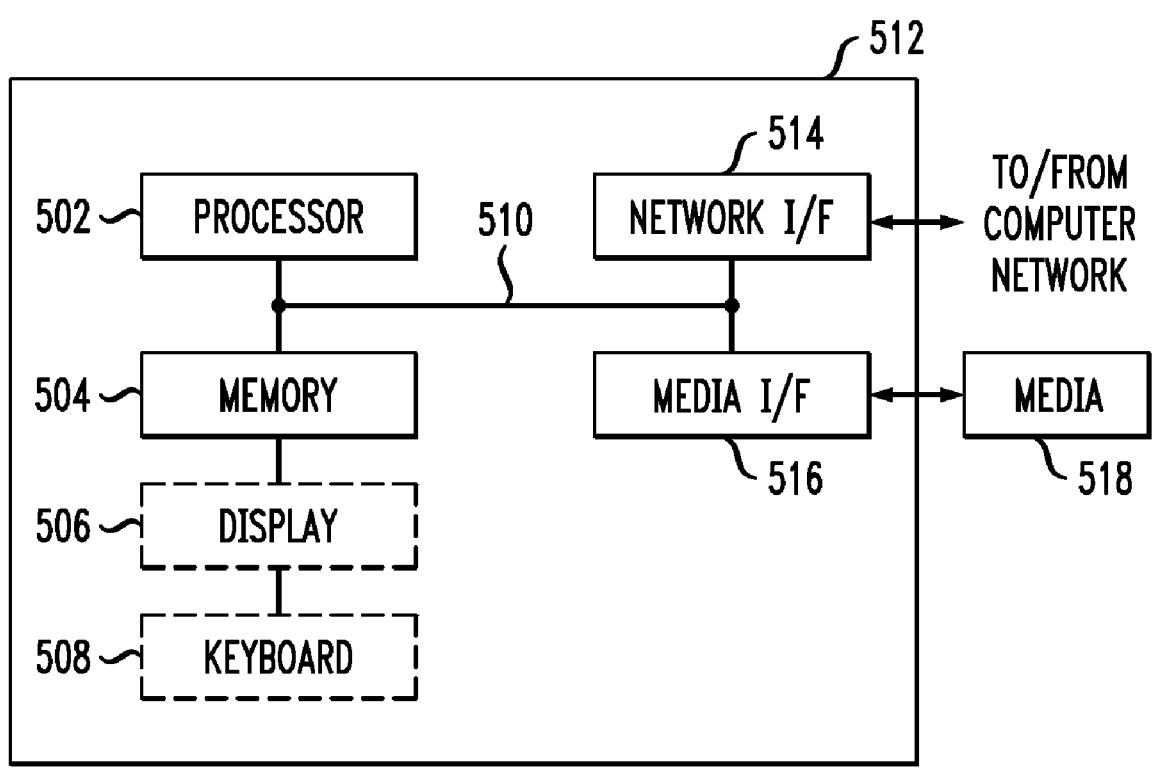
FIG. 5 depicts a computer system that may be useful in implementing one or more aspects and/or elements of the present invention.

At present, it is believed that one or more embodiments will make substantial use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry Further, the term "processor" may refer to mote than one individual processor The term "memory" is intended to include memory associated with a processor or CPU, such as, for example, RAM (random access memory), ROM (read only memory), a fixed memory device (e.g., hard drive), a removable memory device (e.g., diskette), a flash memory and the like In addition, the phrase "input/output interface" as used herein, is intended to include, for example, one or more mechanisms for inputting data to the processing unit (e.g., mouse), and one or more mechanisms for providing results associated with the processing unit (e g, printer) The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. Such software could include, but is not limited to, firmware, resident software, microcode, and the like.

Furthermore, the invention can take the form of a computer program product accessible from a computer-usable or computer-readable medium (e.g., media 518) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (e.g. memory 504), magnetic tape, a removable computer diskette (e.g. media 518), a random access memory (RAM), a read-only memory (ROM), a rigid magnetic disk and an optical disk Current examples of optical disks include compact disk-read only memory (CD-ROM), compact disk-read/write (CD-R/W) and DVD.

A data processing system suitable for storing and/or executing program code will include at least one processor 502 coupled directly or indirectly to memory elements 504 through a system bus 510. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, e.g., application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for identifying process elements comprising the steps of:

providing a system, wherein said system comprises distinct software modules, each of said distinct software modules being embodied on a tangible computer-readable recordable storage medium, and wherein said distinct software modules comprise an input module, a mapping module, and a graphing module;

obtaining a plurality of relevant request-response pairs by executing said input module on at least one hardware processor, said request-response pairs comprising at least request identifiers and spanning at least one network connection in at least one enterprise;

mapping said request identifiers to corresponding artifacts by executing said mapping module on said at least one hardware processor, said artifacts comprising unique representations of similar combinations of said request identifiers;

identifying actions based on said artifacts, said identifying of said actions being carried out, at least in part, by executing said mapping module on said at least one hardware processor;

mapping said actions to process elements such that each given one of said process elements has an associated artifact, said mapping of said actions being carried out, at least in part, by executing said mapping module on said at least one hardware processor;

constructing a process graph with a plurality of nodes by executing said graphing module on said at least one hardware processor, each of said nodes corresponding to a given one of said process elements and its associated artifact, said graph comprising intra-system and inter-system transitions, said request-response pairs further comprising at least user information;

capturing at least selected ones of said transitions based on said user information by executing said graphing module on said at least one hardware processor;

analyzing said graph to identify unique processes of said at least one enterprise and group role players having similar behavior from among users identified by the user information in the request-response pairs, by executing said graphing module on said at least one hardware processor; and performing noise reduction on said graph by removing at least one of incorrect transitions and unrelated flow nodes from said graph.

2. The method of claim 1, wherein said noise reduction comprises removing a given one of a pair of nodes from said graph wherein a difference between said pair of nodes is small, said distance being measured over at least four dimensions, said dimensions comprising user, artifact, data, and action.

3. The method of claim 1, wherein said noise reduction comprises removing a given transition from said graph when said transition connects an end node to a following start node, thereby resulting in two sample paths.

4. The method of claim 1, wherein said noise reduction comprises performing at least one of connecting and separating overlapping processes based on information associated with said artifacts.

5. The method of claim 1, further comprising the additional step of assigning a level of certainty to each of said selected transitions.

6. The method of claim 1, wherein said analyzing is performed via a distance string metric.

7. The method of claim 6, further comprising the additional step of creating a process map that defines process paths associated with said unique processes and associates said group role players with corresponding ones of said process elements.

8. A method for identifying process elements comprising the steps of:

providing a system, wherein said system comprises distinct software modules, each of said distinct software modules being embodied on a tangible computer-readable recordable storage medium, and wherein said distinct software modules comprise an input module, a mapping module, and a graphing module;

obtaining a plurality of relevant request-response pairs by executing said input module on at least one hardware processor, said request-response pairs comprising at least request identifiers and spanning at least one network connection in at least one enterprise;

mapping said request identifiers to corresponding artifacts by executing said mapping module on said at least one hardware processor, said artifacts comprising unique representations of similar combinations of said request identifiers;

identifying actions based on said artifacts, said identifying of said actions being carried out, at least in part, by executing said mapping module on said at least one hardware processor;

mapping said actions to process elements such that each given one of said process elements has an associated artifact, said mapping of said actions being carried out, at least in part, by executing said mapping module on said at least one hardware processor;

constructing a process graph with a plurality of nodes by executing said graphing module on said at least one hardware processor, each of said nodes corresponding to a given one of said process elements and its associated artifact, said graph comprising intra-system and inter-system transitions, said request-response pairs further comprising at least user information;

capturing at least selected ones of said transitions based on said user information by executing said graphing module on said at least one hardware processor; and analyzing said graph to identify unique processes of said at least one enterprise and group role players having similar behavior from among users identified by the user information in the request-response pairs, by executing said graphing module on said at least one hardware processor;

wherein said step of obtaining said plurality of relevant request-response pairs in turn comprises:

capturing information flow in a client-server system with rule-based filtering;

recreating request-response pairs based on said information flow; and filtering said request-response pairs to obtain said relevant request-response pairs, said relevant request-response pairs corresponding to:

(i) entering of information by users, and (ii) user requests for new information, in connection with one of said artifacts.

9. The method of claim 8, wherein said capturing comprises capturing user information, requests for data objects, and return responses to said requests for data objects.

10. A computer program product comprising a tangible computer readable recordable storage medium including computer useable program code for identifying process elements, said computer program product including:

computer useable program code for obtaining a plurality of relevant request-response pairs, said request-response pairs comprising at least request identifiers and spanning at least one network connection in at least one enterprise;

computer useable program code for mapping said request identifiers to corresponding artifacts, said artifacts comprising unique representations of similar combinations of said request identifiers;

computer useable program code for identifying actions based on said artifacts;

computer useable program code for mapping said actions to process elements such that each given one of said process elements has an associated artifact;

computer useable program code for constructing a process graph with a plurality of nodes, each of said nodes corresponding to a given one of said process elements and its associated artifact, said graph comprising intra-system and inter-system transitions, said request-response pairs further comprising at least user information;

computer useable program code for capturing at least selected ones of said transitions based on said user information;

computer useable program code for analyzing said graph to identify unique processes of said at least one enterprise and group role players having similar behavior from among users identified by the user information in the request-response pairs; and computer useable program code for performing noise reduction on said graph by removing at least one of incorrect transitions and unrelated flow nodes from said graph.

11. A computer program product comprising a tangible computer readable recordable storage medium including computer useable program code for identifying process elements, said computer program product including:

computer useable program code for obtaining a plurality of relevant request-response pairs, said request-response pairs comprising at least request identifiers and spanning at least one network connection in at least one enterprise;

computer useable program code for mapping said request identifiers to corresponding artifacts, said artifacts comprising unique representations of similar combinations of said request identifiers;

computer useable program code for identifying actions based on said artifacts;

computer useable program code for mapping said actions to process elements such that each given one of said process elements has an associated artifact;

computer useable program code for constructing a process graph with a plurality of nodes, each of said nodes corresponding to a given one of said process elements and its associated artifact, said graph comprising intra-system and inter-system transitions, said request-response pairs further comprising at least user information;

computer useable program code for capturing at least selected ones of said transitions based on said user information; and computer useable program code for analyzing said graph to identify unique processes of said at least one enterprise and group role players having similar behavior from among users identified by the user information in the request-response pairs;

wherein said computer useable program code for obtaining said plurality of relevant request-response pairs in turn comprises computer useable program code for:

capturing information flow in a client-server system with rule-based filtering;

recreating request-response pairs based on said information flow; and filtering said request-response pairs to obtain said relevant request-response pairs, said relevant request-response pairs corresponding to:
(i) entering of information by users, and
(ii) user requests for new information,
in connection with one of said artifacts.

12. An apparatus for identifying process elements, comprising:
a memory; and
at least one processor coupled to said memory and operative to:
obtain a plurality of relevant request-response pairs, said request-response pairs comprising at least request identifiers and spanning at least one network connection in at least one enterprise;
map said request identifiers to corresponding artifacts, said artifacts comprising unique representations of similar combinations of said request identifiers;
identify actions based on said artifacts;
map said actions to process elements such that each given one of said process elements has an associated artifact;
construct a process graph with a plurality of nodes, each of said nodes corresponding to a given one of said process elements and its associated artifact, said graph comprising intra-system and inter-system transitions, said request-response pairs further comprising at least user information;
capture at least selected ones of said transitions based on said user information;
analyze said graph to identify unique processes of said at least one enterprise and group role players having similar behavior from among users identified by the user information in the request-response pairs; and
perform noise reduction on said graph by removing at least one of incorrect transitions and unrelated flow nodes from said graph.

* * * * *